(12) United States Patent
Bronoel et al.

(10) Patent No.: US 7,836,175 B2
(45) Date of Patent: Nov. 16, 2010

(54) APPARATUS AND METHOD FOR PROCESSING MANAGEMENT INFORMATION

(75) Inventors: Jean-marc Bronoel, Volbonne (FR); Christophe Laye, Valbonne (FR); Jean-Michel Collomb, Grasse (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 106 days.

(21) Appl. No.: 12/103,319

(22) Filed: Apr. 15, 2008

(65) Prior Publication Data

US 2008/0256102 A1 Oct. 16, 2008

(30) Foreign Application Priority Data

Apr. 16, 2007 (EP) .................................. 07300955

(51) Int. Cl.
*G06F 13/00* (2006.01)
(52) U.S. Cl. ..................... 709/224; 709/219; 719/328
(58) Field of Classification Search ................ 709/223, 709/224, 230, 250, 217, 219; 719/328, 329
See application file for complete search history.

(56) References Cited

U.S. PATENT DOCUMENTS

| | | | |
|---|---|---|---|
| 6,308,174 B1 * | 10/2001 | Hayball et al. ................ 707/10 |
| 6,446,123 B1 * | 9/2002 | Ballantine et al. ........... 709/224 |
| 6,681,211 B1 * | 1/2004 | Gatto ....................... 705/36 R |
| 6,915,340 B2 * | 7/2005 | Tanaka ....................... 709/220 |
| 7,107,339 B1 * | 9/2006 | Wolters ...................... 709/224 |
| 2002/0072988 A1 * | 6/2002 | Aram .......................... 705/26 |
| 2006/0176824 A1 * | 8/2006 | Laver et al. ................. 370/241 |

OTHER PUBLICATIONS

Search Report in Co-Pending European Patent Application No. 07300955.7, dated Aug. 20, 2007.

* cited by examiner

*Primary Examiner*—Viet Vu

(57) ABSTRACT

An apparatus for processing management information, comprising; a processing engine operable to receive current data and store the current data in a data store, a forecaster engine operable to read past data and current data from the data store and generate forecast data, and store the forecast data in a forecast data store, and a user interface module operable to read the past data, current data and forecast data and generate a common output in accordance with the past data, current and forecast data.

16 Claims, 5 Drawing Sheets

APPARATUS AND METHOD FOR PROCESSING MANAGEMENT INFORMATION

DESCRIPTION OF INVENTION

This invention relates to an apparatus and a method for processing management information, particularly but not exclusively, for managing one or more of system or network information.

BACKGROUND OF THE INVENTION

To provide for efficient and high quality delivery of information and technology services, it is necessary to be able to track past performance of a system or network and be able to forecast future performance of the system. Current data or real time data is required to monitor the current health or operation of the system or network, whilst past data, or statistical/historical data may be used in, for example, business intelligence ("BI") applications which process the stored historical data to perform analysis and research on metrics to try and extract the factors relating to past operation and output and to improve future decisions based on the results of the analysis. Future data or forecast data is used to predict future requirements and to support decisions based on identifying trends or other data interactions.

The collected data can fall into two different categories: events and metrics, and are collected from infrastructure management products, such as HP OpenView Operations, HP Network Node Manager, HP OpenView TeMIP, HP OpenView Performance Manager, Mercury SiteScope, or BMC Patrol. An example of an event is of a failure in a system or a system resource being unavailable for some reason, for example an interface on a server being down, or a disk partition being full on a server. A metric is a measure of to what extent a system resource is being used or is available, for example the percentage of CPU consumption or memory use on a given server.

The three functions of monitoring current data, processing past data and generating forecasts are generally provided by separate applications. Accordingly, past data or historical data are stored in a data "warehouse" for example by an ETL process ("Extract, Transform, and Load") which receives the data, transforms it in accordance with the requirements of the BI system, and loads it into the database. To provide real time monitoring of current data, it is known to provide "dashboard" applications which use particular metrics or indicators to provide appropriate displays to summarize the current status of a system and provide warnings, alerts and current status information. Finally, forecasting relies on appropriate analysis programmes which draw extrapolations from past data and trends by use of appropriate algorithms or models.

Such data analysis may be particularly useful in driving management of information technology infrastructure, such as a network, where there may be specific service level management criteria agreed as part of a service level agreement ("SLA") with the users of the system. Accordingly, it is desirable to be able to ensure that the SLA is being met, and to identify any future requirements or potential problems. This can be difficult for a system operator as the past data, current information, and forecast data are handled separately and through different applications.

SUMMARY OF THE INVENTION

According to the first aspect of the present invention, we provide an apparatus for processing management information, comprising a processing engine operable to receive current data and store the current data in a data store, a forecaster engine operable to read past data and current data from the data store and generate forecast data, and store the forecast data in a forecast data store, and a user interface module operable to read the past data, current data and forecast data and generate a common output in accordance with the past data, current data and forecast data.

Providing a common output showing past data, current data and forecast data in this way allows a user to seamlessly and transparently access and interact with the past data, current data and forecast data through the same user interface.

The processing engine may be operable to process the current data and the apparatus may comprise a forecast data processing engine operable to process the forecast data.

The processing engine and the forecast data processing engine may be the same processing engine.

The processing engine may process the current data prior to storing the current data and the forecast data processing engine may process the forecast data prior to storing the forecast data.

The user interface module may be operable to process the past data, current data and forecast date prior to generating the common output.

The user interface module may be operable to receive a desired time input and generate the output in accordance with stored past data and stored forecast data corresponding to the desired time input.

The current data may comprise one or more of network metrics values, network status values, event information and service level information.

According to a second aspect of the invention, we provide a method of processing management information, comprising receiving current data and storing the current data in a data store, reading past data and current data from the data store, generating forecast data, and storing the forecast data in a forecast data store, and reading the past data, current data and forecast data and generating a common output in accordance with the past data current data and forecast data.

The method may comprise the step of processing the current data and processing the forecast data, where the steps of processing the current data and processing the forecast data engine may be similar or the same.

The method may comprise receiving a desired time input and generating the output in accordance with stored past data and stored forecast date corresponding to the desired time input.

BRIEF DESCRIPTION OF THE DRAWINGS

Embodiments of the invention will now be described by way of example only with reference to the accompanying drawings wherein.

DETAILED DESCRIPTION OF THE PREFERRED EMBODIMENTS

Figure 1:
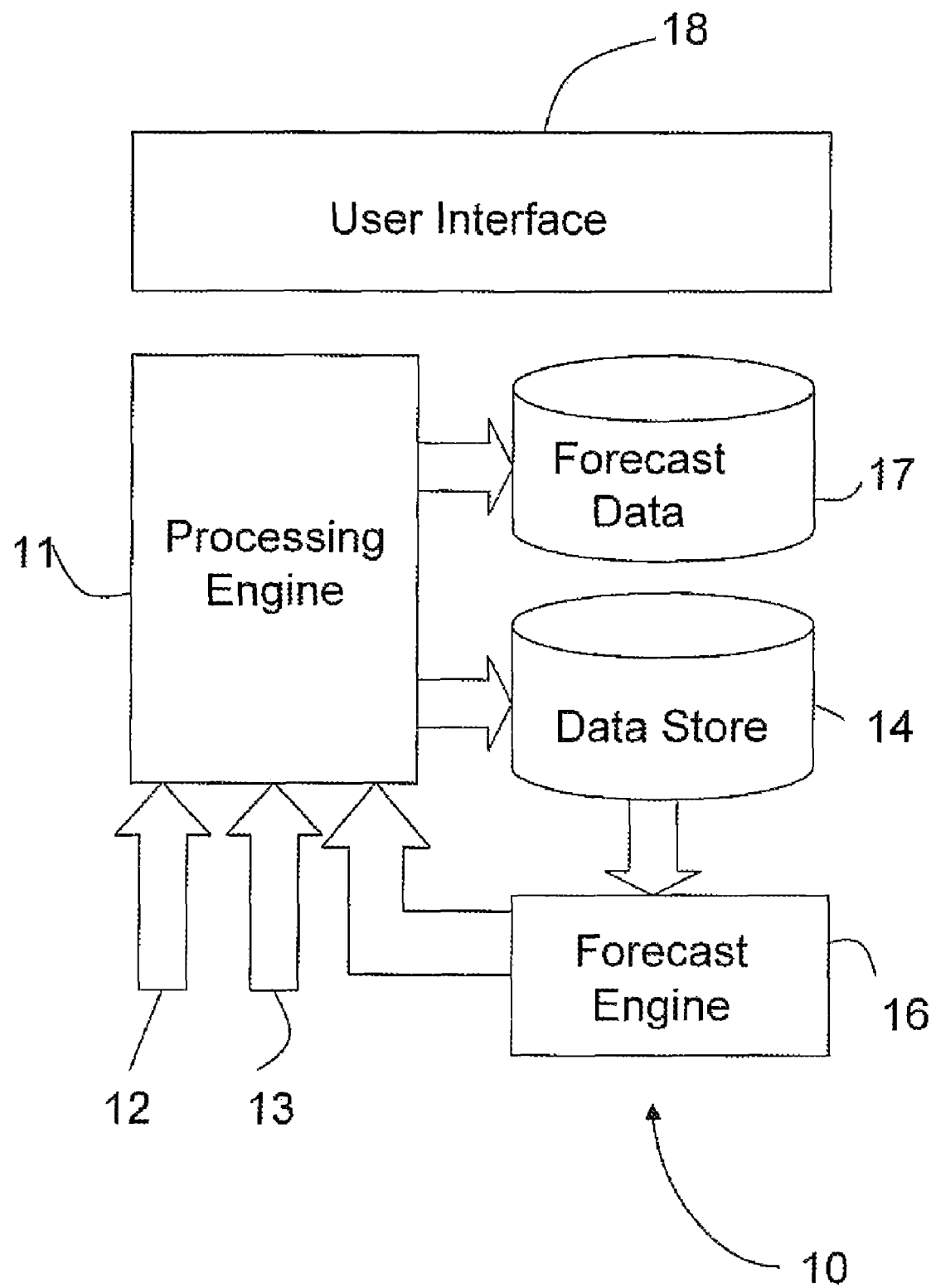
FIG. 1 is a diagrammatic illustration of a first apparatus embodying the present invention.

Referring to FIG. 1, an apparatus embodying the present invention is generally shown at 10. The system comprises a processing engine 11 operable to receive data inputs, for example, metric data as shown at 12 and events information as illustrated at 13. The data may be received from infrastructure management systems, such as HP OpenView Operations, HP Network Node Manager, HP OpenView TeMIP, HP Open-View Performance Manager, Mercury SiteScope, or BMC Patrol, or indeed any other data source. The data may be received periodically, for example where the data comprises metric data, or may be received irregularly, for example when the data relates to an event. The data may be associated with its time of generation or time of receipt, or otherwise date-stamped as appropriate.

The processing engine 11 is operable to process the received data, for example as part of an ETL process, and store the processed data in a data store 14. The current data is thus effectively the most recently processed data stored in the data store 14.

The processing engine may process the data as desired to provide an appropriate output or status. For example, a SLA may specify the minimum availability of a resource or service. The general health status of a service is computed based on the infrastructure status of the service and associated applications using relevant events and metrics. For example, availability of the service may be computed using the availability of the web server accessed by end users and the availability of a data server supplying data to the web server, based on the current demand and the operational status of the servers. The processing engine 11 may process some or all of the data as required.

A forecast engine is shown at 16 operable to read the data store 14 and generate forecast data based on some or all of the stored past data. The forecast engine 16 may for example only generate forecast data based on data stored in a particular time period or relating to a particular metric. The forecasting engine 16 may use any appropriate forecasting algorithm or algorithms as desired, for example using past patterns of demand or events to predict the possible demand on a service and calculate the health status of the service in the same way as for current data to forecast the SLA compliance of the service. The forecast engine 16 is connected to the processing engine 11 as shown. The processing engine 11 is thus operable to process the forecast data and store the forecast data in a forecast data store generally shown at 17. Accordingly, the current data and forecast data are processed in a similar, or possibly exactly the same, manner by the processing engine 11 and stored in separate data stores.

Overlying the system is a user interface module, generally shown at 18, which is operable to read the data store 14 and forecast data store 17 and generate an output based on the data read from the data stores 14, 17.

Figure 2:
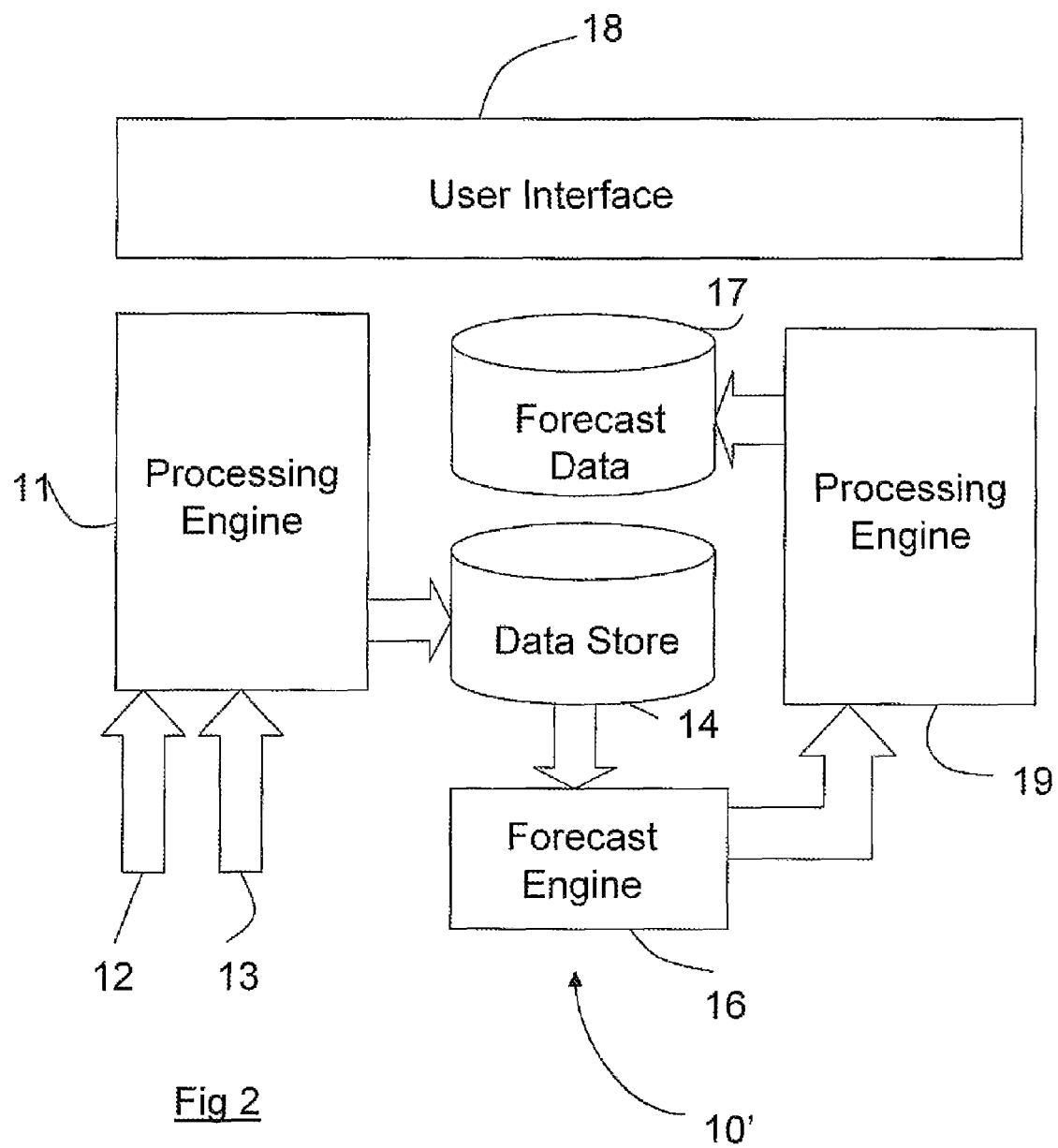
FIG. 2 is a diagrammatic illustration of a second apparatus embodying the present invention.

An alternative configuration is illustrated at 10' in FIG. 2. In this embodiment, the processing engine 11 receives metric data and events data shown at 12 and 13 as in the embodiment of FIG. 1 and stores the data in a data store 14. The forecast engine 16 reads the data store 14 and generates forecast data, but instead this is sent to a separate processing engine 19 to process the forecast data and store it in the forecast data store 17. Advantageously, the processing engine 11 and the processing engine 19 may be similar instances of the same engine, and thus process current data and forecast data in the same way.

Figure 3:
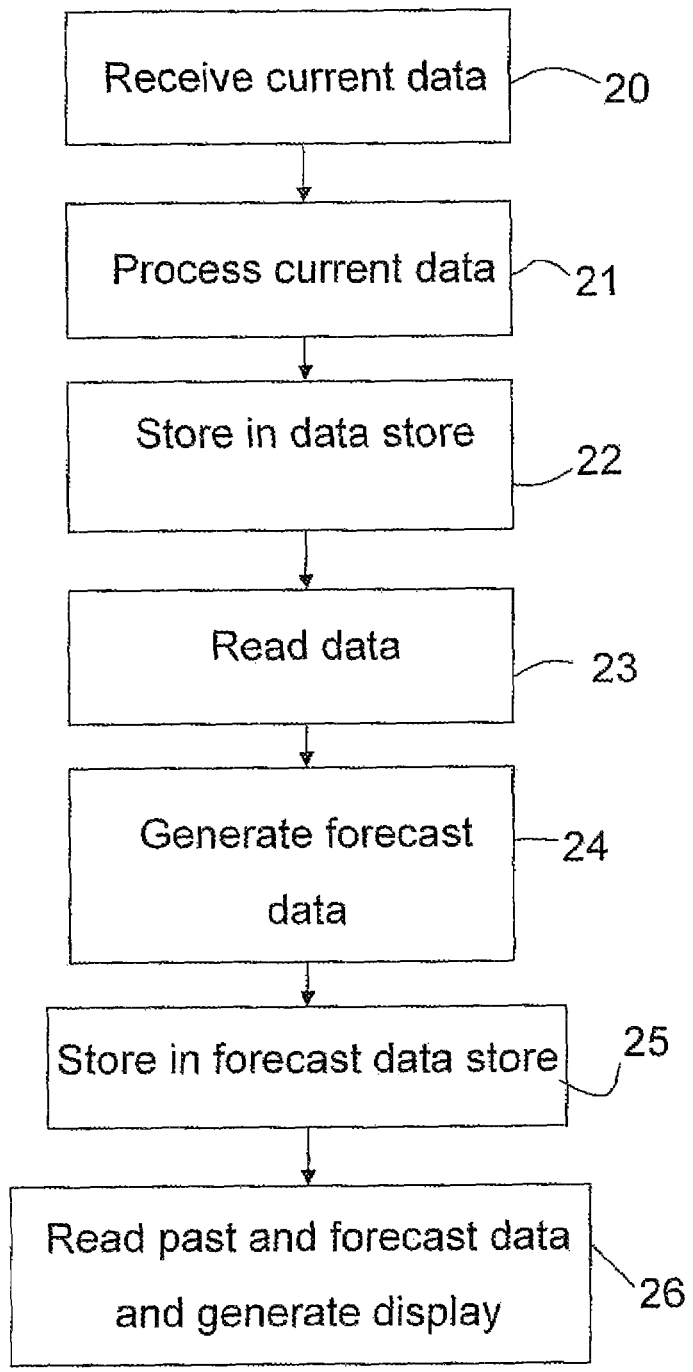
FIG. 3 is a flow chart illustrating a method of operation of the apparatus of FIG. 1.

Consequently, as shown in FIG. 3, the system 10, 10' receives current data as illustrated at step 20, and at step 21 processes the received data and at step 22 stores it in the past data storage 14. The steps may be performed for example as part of a standard ETL process. At step 23 some or all of the past data is read from the data store as appropriate. At step 24, the forecast data is processed to generate forecast data in accordance with any appropriate algorithm or model, and at step 25 stored in the forecast data store 17. At step 26, the forecast data and past data are read by the user interface module 18 and an output generated.

It will thus be apparent that the present system treats historic data, current data, and forecast data in a similar, consistent manner, and may even treat the data in exactly the same way if appropriate. The forecast data and historic data are stored separately, in parallel stores, thus allowing the data to be viewed in a highly flexible manner. Two possible displays will be discussed below by way of example only, but it will be apparent that the information may be made available to use in any other fashion as desired.

Figure 4:
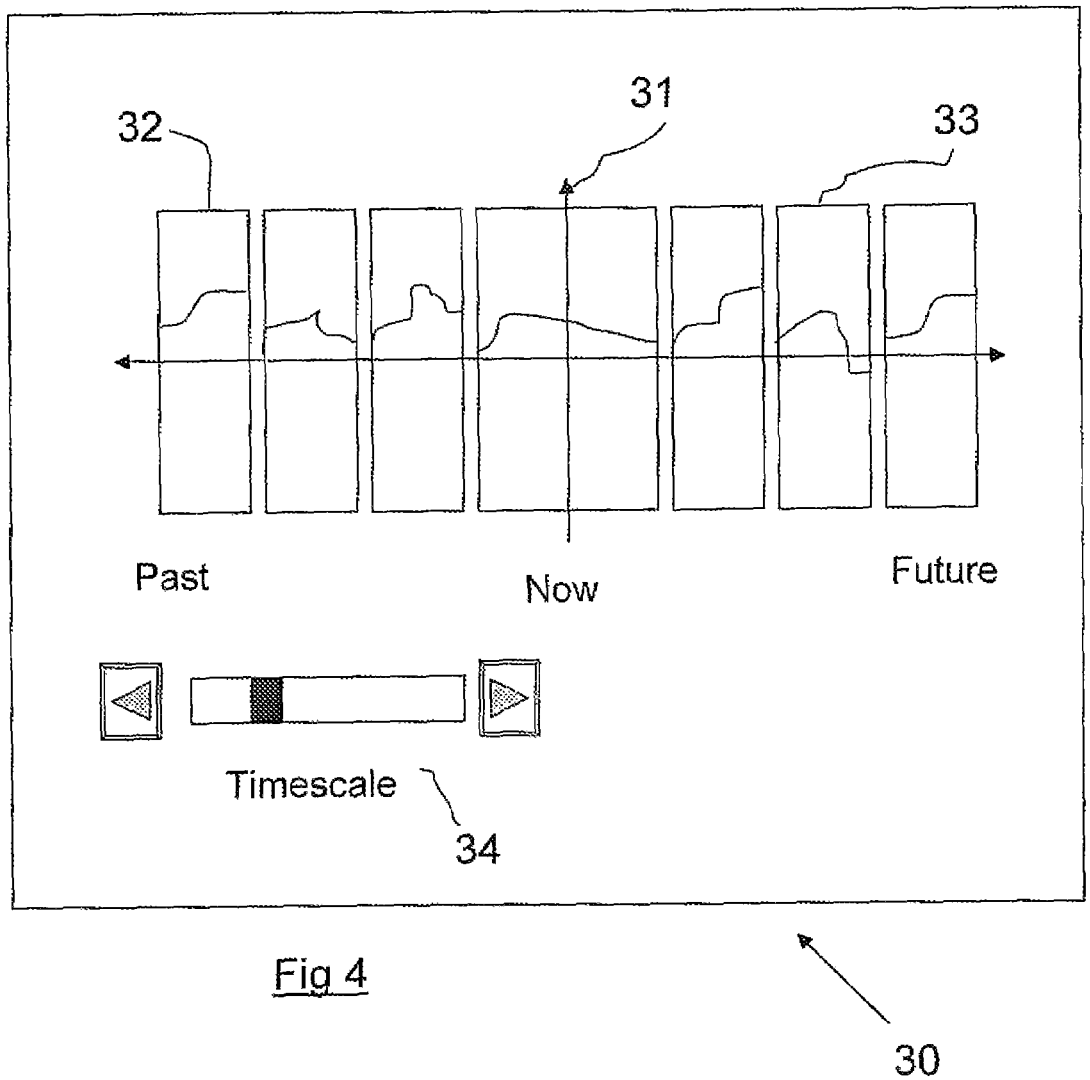
FIG. 4 is an example of a display generated by the apparatus of FIG. 1.

Referring now to FIG. 4, an example display is shown at 30 in which the current time is shown at 31, past data is shown in a set of blocks 32 to the left of the current time indicator and forecast data is shown in a set of blocks to the right of the time indicator 31. Current data will of course lie on the current time indicator. In this example, the blocks 32 and 33 are provided indicating different timescales, but this display may be changed as desired. For example, the blocks 32 may represent data stored in the last year, last month, previous week and previous day, and the blocks 33 may represent forecast data for the next hour, next day, next week and next year. The user can be permitted to change the scale over which data is viewed as indicated by a timescale indicator generally shown at 34. The data to be displayed may be simply read from the data store and forecast data store and an appropriate output generated accordingly, and the past and forecast data may be treated and processed in exactly the same manner by the user interface 18. A single block 32, 33 may be expanded, for example the 'previous hour' block to display all the information from the last hour stored in the data store 14 in more detail. Advantageously, the user may select a desired time point at which to view the data, i.e. by selecting a different time other than the present time, by using the timescale indicator 34. For example, a user may set the viewed time to be two hours in the past. The stored forecast data from two hours ago will be indicated as part of the future blocks 33, and the past data up to the selected time shown in the blocks 32. Accordingly, a user will thus be able to compare forecast data with the actual past data for a given period.

Figure 5:
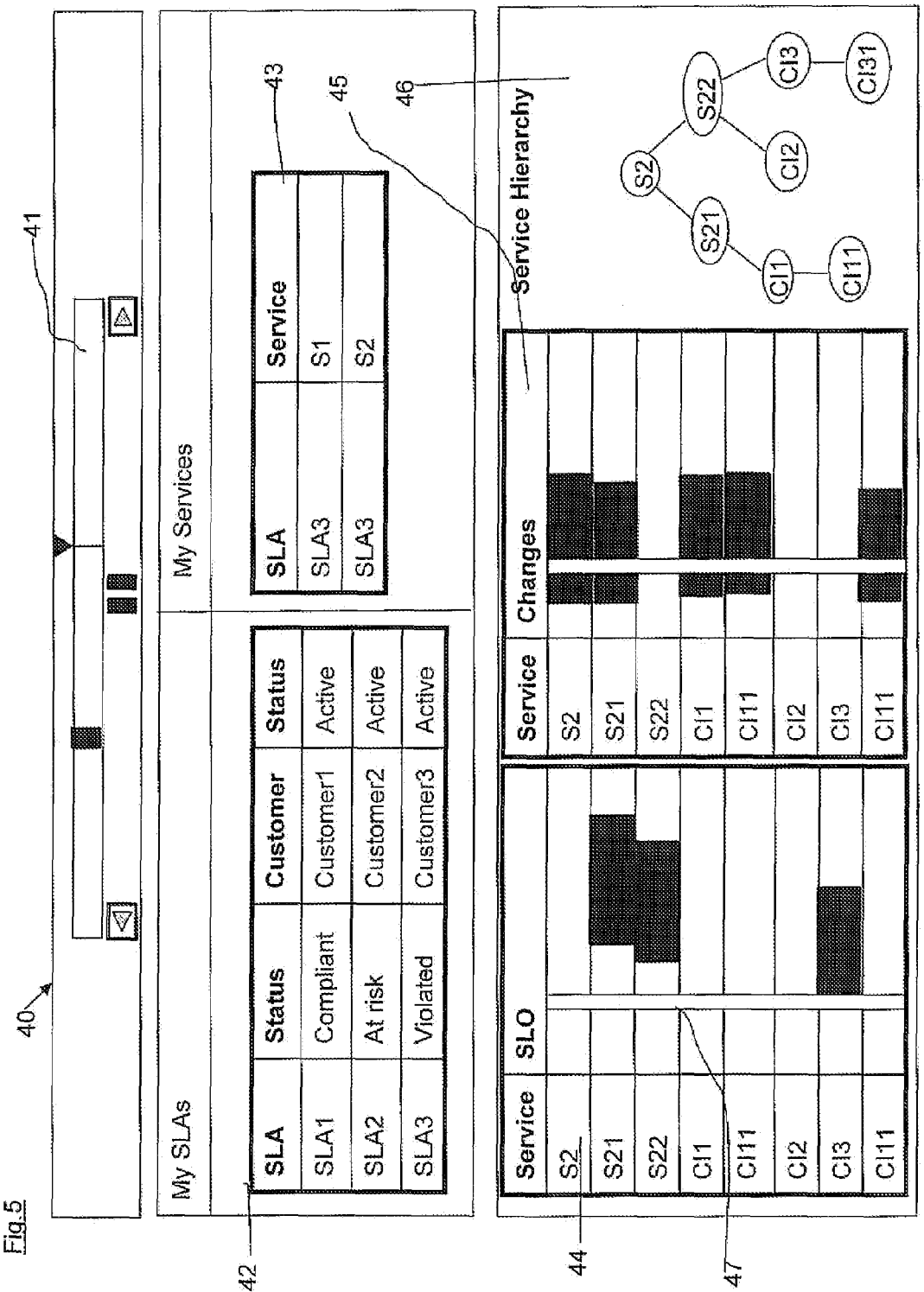
FIG. 5 is an illustration of a further example of an output display.

FIG. 5 shows a dashboard for monitoring service level agreements generally shown at 40. A time bar 41 at the top allows the user to select the past or future time. At 42 the display shows a set of service level agreements which are being monitored and at panel 43 the services to which the selected service level agreement applies. For the selected service level agreement and services, the display shows a set of service level objectives and whether they have been met or violated at 44, a set of changes to the services shown at 45, and the service hierarchy generally shown at 46. A current time bar 47 indicates the time of the selected data. Accordingly, the displays 44, 45, 46 can show continuous displays based on past and forecast data read from the data store 14 and forecast data store 17 in the same manner as for the display of FIG. 4.

Accordingly, it will be apparent that the past, current and forecast data may be made available to the user in the appropriate manner in accordance with the function that the user wishes to perform, in the present example monitoring past and future metrics and checking the status of service level agreements. Although the present examples the methods and apparatus as discussed with reference to monitoring a network SLA, it will be apparent that this is applicable to any application where it is desired to review past data and display projected trends for the same data for monitoring all decision support purposes or otherwise.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. An apparatus for processing network management information, comprising;
    a processing engine operable to receive current network data and store the current network data in a data store,
    a forecaster engine operable to read network data from the data store and generate forecast network data, and store the forecast network data in a forecast data store, and
    a user interface module operable to read past network data, current network data and forecast network data and generate a continuous graphical display based at least in part on common output in accordance with the past network data, current network data and forecast network data, the continuous graphical display having a time axis and a user selectable timescale;
    wherein the forecast network data predicts the demand on a service or predicts the health status of the service;
    wherein the forecast network data and past network data are compared over a time via display.

2. The apparatus according to claim 1 wherein the processing engine is operable to process the current network data and wherein the apparatus comprises a forecast data processing engine operable to process the forecast network data.

3. The apparatus according to claim 2 wherein the processing engine and the forecast data processing engine are the same processing engine.

4. The apparatus according to claim 2 wherein the processing engine processes the current network data prior to storing the current network data and wherein the forecast data processing engine processes the forecast network data prior to storing the forecast network data.

5. The apparatus according to claim 1 wherein the user interface module is operable to process the past network data, current network data and forecast network data prior to generating the common output.

6. The apparatus according to claim 1 wherein the user interface module is operable to receive a desired time input and generate the output in accordance with stored past network data and stored forecast network data corresponding to the desired time input.

7. The apparatus according to claim 1 wherein the current network data comprises one or more of network metrics values, network status values, event information and service level information.

8. A method for monitoring service level agreements for a network of processing management information, comprising;
    receiving current network data and storing the current network data in a data store,
    reading past network data and current network data from the data store, generating forecast network data, and storing the forecast network data in a forecast data store, and
    reading the past network data, current network data and forecast network data and generating a display based at least in part on common output in accordance with the past network data, current network data and forecast network data, the display comprising a status of each of a plurality of service level agreements corresponding to a selected time;
    comparing the forecast network data and past network data over a time via display;
    wherein the forecast network data predicts the demand on a service or predicts the health status of the service.

9. The method according to claim 8 comprising the steps of processing the current network data and processing the forecast network data, wherein the steps of processing the current network data and processing the forecast network data engine are similar or the same.

10. The method according to claim 8 comprising receiving a desired time input and generating the output in accordance with stored past network data and stored forecast network data corresponding to the desired time input.

11. The method according to claim 8, wherein the display further comprises a tree indicating a service hierarchy.

12. The method according to claim 8, wherein the display is a continuous graphical display.

13. The method according to claim 8, wherein the display has a user selectable timescale.

14. The method according to claim 8, wherein the display further comprises a graphical status of each of a plurality of service level objectives, for a selected one of the service level agreements, over a timescale.

15. The method according to claim 8, wherein the display further comprises a listing of services for each of the service level agreements.

16. The method according to claim 8, wherein the display further comprises a change indicator for each of a plurality of services corresponding to the service level agreements over a timescale.

* * * * *